3,157,618
OXIDES OF TIN AS CATALYSTS IN THE PREPARATION OF POLYESTERS
Louis R. Le Bras, Pittsburgh, and Donald F. Stahr, Arnold, Pa., assignors to Pittsburgh Plate Glass Company, Allegheny County, Pa., a corporation of Pennsylvania
No Drawing. Filed Mar. 31, 1959, Ser. No. 803,083
4 Claims. (Cl. 260—75)

This invention relates to the preparation of polyesters such as are employed as hydroxy-containing components in polyurethane resins, used in coating and in foams such as are employed as thermal insulators, as cushioning members, as buoyancy elements, as potting resins and for various other applications, and it has particular relationship to the use of oxide of stannous metals as catalysts in the preparation of such polyesters by direct reaction of a polyol and a polycarboxylic acid or polycarboxylic acid anhydride.

Reactions of esterification involved in the preparation of such polyesters as are employed in the preparation of polyurethane resins or as potting resins and for other purposes, may be effected by heating a mixture of a dicarboxylic acid (or its anhydride) with a polyhydric alcohol such as a glycol, glycerol or a polymethylol compound. Esterification will take place even in the absence of catalysts. However, the reaction requires a long time, e.g., 16 or 18 hours, to obtain acid numbers of 3 or less. For this reason, it is usually preferred to incorporate into the reaction mixture a catalyst, of which p-toluenesulfonic acid is a classic example and the one heretofore most commonly used. This material effectively reduces cooking time for the esterifiable mixture. However, such use is attended by serious objectionable features such as:

(A) a tendency to discolor the product; water-white esters being substantially impossible to obtain by this method.

(B) It is difficult to obtain polyesters, the molecules of which are substantially completely terminated with hydroxyls and which, therefore, are of low acid value. If no catalyst is used, long cooks or high temperatures are required if an acid number below 10 is to be obtained. If paratoluene sulfonic acid is added to the reaction mixture, it is possible to attain an acid number as low as 3 or even 2½, in about 6 to 6½ hours. Usually, it is necessary to employ about a 10 percent excess of the glycol component, if polyesters of low acid number are to be obtained with p-toluenesulfonic acid as a catalyst.

(C) Another objection to p-toluenesulfonic acid as a catalyst resides in the fact that quite substantial amounts, e.g., about 0.1 to about 0.5 percent by weigh based upon the reaction charge, is usually required.

(D) Still another serious objection to polyesters prepared by use of p-toluenesulfonic acid as a catalyst resides in the fact that the polyesters obtained possess poor stability in the presence of moisture and at elevated temperatures.

In United States Patent 2,720,507 to J. R. Caldwell, it is disclosed that certain compounds of tin, containing alkali metal or alkaline earth metal groups or hydrocarbon groups attached directly to the tin atoms, are effective catalysts of the ester interchange between esters of monohydric alcohols and certain complex polycarboxylic acids to form polyesters. A necessary condition in this use of tin compounds, containing hydrocarbon groups attached directly to the metal, resided in the fact that water must be kept from the reaction zone. This, of course, precludes the use of these compounds in a direct esterification reaction between a polyol and a polycarboxylic acid or the anhydride thereof, since the latter types of reaction are inherently attended by the evolution of considerable amounts of water.

This invention is based upon the surprising discovery that oxides of tin, and notably stannous oxide, constitute excellent catalysts of direct esterification reaction between polycarboxylic acids (or the anhydrides thereof) and polyols containing about 2 to 6 hydroxyl groups per molecule. The water apparently does not adversely affect the condensation reaction involved in ester formation, and the reaction proceeds rapidly and smoothly to a high degree of completion.

Oxides of tin which may be used in the catalysts of condensation reactions involved in the formation of polyesters, in accordance with this invention, comprise:

Stannous oxide
Dialkyl tin oxides containing alkyl groups of 1 to 10 carbon atoms such as—
    Dibutyl tin oxide
    Dimethyl tin oxide
    Didecyl tin oxide
Diaryl tin oxides such as—
    Diphenyl tin oxide
    Dibenzyl tin oxide Related compounds of the oxides of tin comprise the salts formed between oxides of tin and metals such as lead, and being represented by the stannates of:

| | |
|---|---|
| Lead | Nickel |
| Magnesium | Antimony |
| Bismuth | Potassium |
| Cacium | Sodium |

All of these stannates comprise the $SnO_3$ group.

These oxides of tin or their stannates may be used in amounts of about 0.001 to about 2 percent by weight based upon the esterifiable mixture, and the presence of or absence of diluents for the esterifiable mixture and their reaction products.

Important advantages of the use of tin oxide or the stannates of metals as herein disclosed, in the esterification reaction may be listed as follows:

Very fast cooks of the esterification mixture at moderate temperatures can be obtained;

Very low acid values, e.g., of 2 or even less, are very readily obtained in the cooking operation even when practically theoretical amounts of a polyol are employed; acid values of about 1 can be obtained with a glycol excess of 3 percent or even less;

The color of the polyesters obtained when an oxide of tin is used as a catalyst is excellent, it being quite possible to obtain polyesters often in a nearly water-white state.

Polyesters of very high hydrolytic stability may be obtained.

Still another important feature of this invention resides in the discovery that when an oxide of tin is used as a catalyst, the color of the product can be still further improved by treating the product with a small amount (about 0.01 to about 1 percent by weight based upon the mixture) of carbon black. The latter can be filtered off at the end of the reaction with the aid of diatomaceous earth, leaving a beautifully clear (water-white) polyester.

In considering the materials which can be effectively used in the practice of the present invention, it will be apparent that the tin oxides herein disclosed, may be employed in the esterification of a great many polycarboxylic acids and a great many polyols. In performing the esterification reaction, either the acids or anhydrides (where anhydrides exist) may be used. In any event, the ultimate polyester is the same regardless of whether the reaction is between the free polycarboxylic acid or its anhydride. The term "acid" as used herein, therefore, is often intended to include both the acid and the anhydride thereof.

Polyesters of the following representative polycarboxylic acids may be prepared:

| Dimer acids [1] | Oxalic acid |
|---|---|
| Adipic acid | Sebacic acid |
| Succinic acid | Azelaic acid |
| Phthalic acid | Isosebacic acid |
| Isophthalic acid | Fumaric acid |
| Terephthalic acid | Malic acid |
| Diglycolic acid | Glutaric acid |
| Maleic acid | Diphenic acid |

The mixtures of any two or more of these acids are included in amounts of about 1 to about 50 percent, the rest of the mixture being 1 or more of the remaining acids.

The foregoing list of acids, it is to be emphasized, is but illustrative and therefore but partial. Manifestly, many other polycarboxylic acids may also be employed if so desired.

Likewise, the principles of the present invention are applicable to the use of a relatively wide range of polyols. Some of these usually are glycols, of which the following constitutes a partial list of those from which selection can be made:

| Ethylene glycol | Neopentyl glycol |
|---|---|
| Propylene glycol | 1,4-butane diol |
| Diethylene glycol | 1,5-pentane diol |
| Dipropylene glycol | Trimethylene glycol |
| Triethylene glycol | Polyethylene glycol |
| Polypropylene glycol | |

Mixtures of any two or more of these diols are included.

Often, the glycols above enumerated are mixed with or completely replaced by appropriate amounts of a polyol containing 3 or more (e.g., up to 6) hydroxyl groups and being represented by:

| Trimethylol ethane | Pentaerythritol |
|---|---|
| Trimethylol propane | Sorbitol |
| Glycerol | Methyl glycoside |
| 1,2,6-hexane triol | Mannitol |

The diol and polyol components are employed in an amount theoretically to react with all carboxyls and to give hydroxyls imparting desired hydroxyl values (e.g., 40 to 700) to the polyester.

Usually, though not always, the esterification reaction is also conducted in the presence of an appropriate non-reactive liquid diluent, which may be selected to provide a constant boiling mixture with the water evolved in the reaction, but being insoluble in water. Such diluents facilitate the removal of water from the reaction zone and thus cause the reaction to go in the desired direction. Appropriate diluents of this type comprise liquid aromatic hydrocarbons such as are recognized to be useful in esterification reactions to form polyesters. However, it is an advantage of the oxides of tin and the stannates of metals as catalysts, that they can also be used with effect in fusion cooks in the absence of liquid diluents.

In conducting the esterification reaction contemplated by this incention, any convenient form of esterification apparatus may be employed; for example, it may assume the form illustrated in the copending application of Carl C. Georgian and Robert A. Wavering, Serial No. 418,140, filed March 23, 1954. In those instances in which the polyol component tends to be volatile and to escape from the reaction zone, recovery procedures such as disclosed in the foregoing application are applicable.

The glycol recovery process of said application, also applicable in this case, comprises cooking in a kettle equipped with a column, a mixture of a polyol such as propylene glycol and a dicarboxylic acid (or its anhydride) such as a mixture of maleic anhydride and adipic acid, or phthalic anhydride dissolved in a solvent such as xylene.

In conducting the reaction in said apparatus, but with tin oxide or stannate of metal as a catlyst, the reactants and catalyst are introduced into about 5 to 15 percent of a nonreactive solvent designed to form a constant boiling mixture with, and thus to remove water from the reaction zone with the off vapors. Appropriate media include xylene, toluene and benzene already referred to and other solvents which do not enter into the reaction, which form constant boiling mixtures with water and which are insoluble in water. The vapors comprising those of water, some vapors of glycol and solvent pass up through the column. The vapors may be washed with water at about 90 to 100° C. in the top of the column to prevent polyol losses, but this is a nonessential refinement of technique.

The apparatus and techniques of the foregoing patent application are optional. In many instances, polyol recovery from the reaction vapors from the kettle is not required. In that event, the diluent is simply distilled to remove water of reaction from the reacton zone. The diluent after condensation and separation of water, can be recirculated.

As already stated, it is an adavntage of the present invention that the reaction mixture can easily be cooked to a very low acid value, for example, to a value below 3 and usually below 1. Therefore, if excessive evaporational losses are prevented, it seldom is necassary to employ any great excess of polyol component beyond that which is actually used up in the reaction in the esterification of the carboxyls and in the provision of terminal hydroxyls on the polyester chains. A 3 percent, or even smaller excess, is usually sufficient, though higher percentages, for example, 5 percent or more, may be employed if so desired. Such higher percentages usually do not favor economy of operation.

In those instances in which the reaction is employed to provide polyesters containing hydroxyls adapting them for reaction with diisocyanates such as tolylene diisocyanate, to form polyurethane resins, tailoring of the polyesters to meet particular requirements may be necessary. Those polyesters employed in the formation of more soft and flexible types of polyurethane foams generally comprise relatively long chains of alternating polyhydric alcohol residues and polycarboxylic acid residues, the terminal units being the polyhydric alcohol or polyol component and the intermediate portion of the chains comprising polycarboxylic acid and polyhydric alcohol components in alternation. Even in the polyesters used to form soft foams, some branching of the chain is usually provided by inclusion of a small amount of a polyol containing three or more hydroxyls, in which instance, hydroxyls dispersed at intervals along the chain as a backbone may occur. Due to the type of polyester, a relatively large number of the glycol and polycarboxylic components will occur in the chain; usually, the chain averages about 15 to about 20 or more of each of the residues. These polyesters are of comparatively low hydroxyl value as well as low acid value. For the flexible foams, the hydroxyl value ordinarily will be in a range of about 40 to about 75.

---

[1] The term "dimer acids" as employed herein includes those acids containing a plurality of carboxyls and which result through Diels-Alder ethylenic reaction of drying oil acids such as linoleic acid or linolenic acid, or mixtures of the two in well-known manner.

In order to obtain polyesters useful for the preparation of rigid-type foams, it is desirable to increase the content of polyol containing three or more hydroxyls as compared with the diol content. The resultant polyesters are of relatively short chain lengths, seldom containing more than five polyol units in any given length and are characterized by a higher degree of branching, thus proportionally providing a great many more termini for hydoxyl groups. These polyesters usually are of relatively high hydroxyl value, e.g., 200 or more. Of course, it is also contemplated to tailor the polyesters in such manner as to provide for the formation of foams of intermediate hardness. Cooking of the polyesters is continued until the acid value has dropped to a point commensurate with the requirements of the application to which the material is to be put, usually to a range below 3, often to nearly zero. This capacity for esterifying the polyesters to such low acid values smoothly and quickly without the use of large excesses of polyol, is unusual in catalysts.

The use of oxides of tin and stannates of metals in the preparation of polyesters suitable for use in the manufacture of polyurethane foams, is illustrated by the following examples:

EXAMPLE I

In this example, a number of different tin compounds which are oxides or at least are stannates of metals, were employed as catalysts in the preparation of a polyester of low hydroxyl value, low acid number, and being particularly well adapted for use in the preparation of flexible polyurethane foams. The esterifiable composition of this example was employed in the tests because it is of a type which is particularly difficult to prepare by conventional methods. The polyester components comprised:

| | Moles |
|---|---|
| Adipic acid | 10.0 |
| Diethylene glycol | 10.3 |
| Trimethylol propane | 0.55 |

In most instances, the oxide of tin or a stannate thereof, was added to this mixture in an amount of about 0.1 to 0.01 percent by weight based upon the total charge. A solvent or diluent, namely xylene, in an amount of about 5 to 15 percent by weight based upon the charge, was added.

In each run, the mixture was charged into an appropriate container for cooking polyesters, the container being equipped in conventional manner with electrical heating means, a stirrer, temperature recording means, and a reflux type packed column. The top of the column was also equipped with a condenser, which was further connected to a separator-type trap adapted to separate water of reaction from condensed solvent and to return the solvent to the reaction zone in the container. The container was also provided with an inlet for the introduction of inert gas, such as carbon dioxide or nitrogen, designed to assist in the exclusion of, or removal of oxygen and also in the removal of water vapors from the reaction vessel. The apparatus was provided with appropriate seals to prevent, insofar as practicable, the introduction of air into the container and also to prevent uncontrolled loss of vapors.

In conducting the reaction, heat was initially placed at maximum in order to melt all of the solid monomeric material, and the agitator was started as soon as possible in order to insure uniform melting and heating of the mixture. The introduction of inert gas to blanket the mixture was initiated after all components were melted.

The temperature of reaction was maintained at about 195° C. and at this temperature, water was evolved and taken off through the separator. Solvent, either toluene or xylene, was added to the batch to establish reflux and refluxing was continued at 195° C. in the container until the acid number of the batch, as determined by conventional tests, had dropped at least to 15 or 20. The evolution of water gave evidence that the reaction was in progress. When it ceased to evolve, even when the temperature in the reaction zone was raised, it was regarded as complete. The reaction was run to completion, if necessary, with an increase of the temperature in the reaction zone to a range of 220° C. to 240° C. until the desired acid value had been attained. The time taken to reach an acid value of 2.5 is considered as the time of cook. The solvents were removed from the product at the conclusion of the reaction by blowing the product with inert gas. Blowing was continued until a Gardner-Holdt bubble viscosity of Z5+¼ at 100 percent solids was obtained. During this time, the acid value usually dropped even further, for example, to 1 or 2.

A number of significant tests, including acid numbers, color checks by both the APHA and the Gardner methods, were conducted upon the product. In some instances, tests were made to determine hydrolytic stability. In the latter test, the change in acid number of a resin sample after an exposure to a temperature of 158° F. under an atmosphere of 90 to 100 percent relative humidity for a period of 24 hours was observed. A change in acid number of 1 or less is considered satisfactory.

The tin compound employed, the solvent medium employed in the reaction, the time of reaction, the temperature required to obtain an acid number of 2.5, the Gardner color( the APHA color, the hydrolytic stability, and the comments upon the rate of cook, the stability of the product, and the color of the product for each charge, are tabulated under appropriate headings in the table to follow.

*Table I*

| Catalyst | Conc., percent | Time, Hours | Temp., °C. | Solvent | Color Gard. | Color APHA | Hydrolytic Stability | Comments |
|---|---|---|---|---|---|---|---|---|
| Stannous oxide | 0.003 | 4.2 | 240 | Xylene | 2 | 235 | 0.02 | Fast cook; fair color. |
| Do | 0.005 | 5.5 | 220 | do | −1 | 155 | 0.02 | Fast cook; good color. |
| Do | 0.0065 | 7.3 | 195 | do | 1 | 190 | | Medium cook; good color. |
| Do | 0.0065 | 4.5 | 220 | do | 1 | 190 | | Fast cook; good color. |
| Do | 0.0065 | 3.7 | 240 | do | 2–3 | 255 | | Fast cook; fair color. |
| Do | 0.01 | 3.9 | 220 | do | 1 | 190 | | Fast cook; good color. |
| Dibutyl tin oxide | 0.01 | 5.3 | 220 | do | −1 | 110 | 0.53 | Fast cook; excellent color. |
| Dimethyl tin oxide | 0.009 | 5.7 | 220 | do | 2 | 275 | 0.11 | Fast cook; fair color. |
| Lead Stannate | 0.037 | 5.0 | 220 | do | 1–2 | | | Fast cook; fair color; some haze. |

EXAMPLE II

This example illustrates the use of a tin oxide as a catalyst in the preparation of a further polyester which is useful in forming soft, flexible foams by reaction with tolylene diisocyanate. The polycarboxylic acid in this instance, is a so-called dimer acid obtained by Diels-Alder reaction of drying oil acids; techniques of preparing such acids are illustrated in many articles and patents such as:

Journal of the American Chemical Society, March, 1947, pp. 65–68

Paint and Oil Chemical Review, January 4, 1954, pp. 13, 14, 16, 26, 28 and 29
United States Patent No. 2,482,760
United States Patent No. 2,482,761

A commercial grade of these dimer acids sold under the trade name of Emery Acid 3065-S, is quite suitable for use in the preparation of polyesters by employing as a catalyst, a tin oxide-containing compound, in accordance with the provisions of the present invention.

The components of an appropriate polyester may be listed as follows:

| | Parts by weight |
|---|---|
| Dimer acid (Emery 3065-S) | 72.7 |
| Triethylene glycol | 25.3 |
| Trimethylol ethane | 2.0 |

This mixture may be cooked by fusion (in the absence of solvents) with about 0.01 percent by weight based upon the mixture, of stannous oxide. An appropriate fusion temperature is about 235° C. The batch can be cooked to a hydroxyl number of about 60 in less than 6 hours. The polyester is useful in forming soft, flexible polyurethane resins.

In this reaction, the triethylene glycol can be replaced partially or completely by diethylene gylcol, though the resultant polyester tends to be more viscous.

EXAMPLE III

The following example illustrates the preparation of a polyester of relatively high hydroxyl value and being well designed for use in the preparation of more rigid polyurethane foams. The components and the molecular ratios of the components of this polyester are as follows:

| | Moles |
|---|---|
| Adipic acid | 11.0 |
| Trimethylol propane | 11.8 |
| Diethylene glycol | 5.6 |

This mixture is catalyzed with about 0.001 to about 0.1 percent by weight based upon the mixture, of the dihydrate of stannous oxide. The mixture is also diluted with a reflux amount of toluene as an azeotropic solvent. The mixture is heated in an appropriate apparatus, such as a kettle, in accordance with the provisions of the foregoing examples, at a temperature of 195° C. to 240° C. Water is evolved and the reaction is regarded as complete when it ceases to evolve. This polyester is well adapted for mixing with tolylene diisocyanate and water or halogenated hydrocarbons, to form a polyurethane foam of rigid type. The latter reaction is conducted in accordance with conventional techniques for the preparation of rigid foams.

EXAMPLE IV

This example illustrates the preparation of a rigid foam using a mixture of dibasic acids. Only triols are used as the polyol component.

The reaction mixture comprises:

| | Moles |
|---|---|
| Adipic acid | 3.0 |
| Phthalic acid | 1.5 |
| Trimethylol propane | 6.8 |

Xylene is added as a diluent. The mixture is catalyzed with about 0.01 percent by weight based upon the mixture, of stannous oxide and is cooked to desired acid number (2.5 or less). The polyester has a high hydroxyl number and is particularly useful in the preparation of extremely tough, rigid foams which are serviceable at relatively high temperatures.

Other dibasic acids such as fumaric acid, maleic acid, isophthalic acid and succinic acid, may be used in the place of phthalic acid. Mixtures of triols are also useful for some purposes.

EXAMPLE V

This example is illustrative of the use of a tin oxide as a catalyst in a so-called fusion cook, in which solvents are omitted. The esterfiable charge comprises:

| | Moles |
|---|---|
| Adipic acid | 10.0 |
| Diethylene glycol | 10.6 |
| Trimethylol propane | 0.55 |
| Stannous oxide | 0.01 |

This mixture is cooked at 220° C. in order to obtain an acid number of 2.5 or lower. The polyester is well adapted for mixing with tolylene diisocyanate to form polyurethane resins.

The oxides of tin, where used as catalysts resulted in fast cooks and the resultant polyesters were of very good stability, color and other desirable properties. These polyesters were all well adapted for use with diisocyanates, such as toluene diisocyanate, in the preparation of polyurethane foams.

Emphasis has been placed upon the preparation of polyesters which can be emulsified with water and reacted with a diisocyanate such as tolylene diisocyanate, to form foams. If the water is omitted, little or no foaming occurs. This is desirable in coating compositions and other non-foamed polyurethane resins. The tin oxide and metal stannates, therefore, can be used to prepare polyesters similar to those above described, which are reacted with isocyanates in the absence of water, to provide polyurethane coatings.

The catalysts of this invention can also be mixed with mixture of caids such as phthalic acid, and fatty acids such as stearic acid, oleic acid and linoleic acid, and cooked with polyols such as glycerol, to provide alkyd resins useful in coatings.

We claim:
1. A method of preparing a polymeric polyester which comprises forming a mixture of:
  (A) a free alcohol containing at least two hydroxyl groups;
  (B) a free carbonyl compound selected from the class consisting of a dicarboxylic acid and the anhydride thereof, said alcohol and said compound consisting of atoms of carbon, hydrogen and oxygen, the alcohol being present in an amount to provide a polyester having a hydroxyl value in a range between 40 and 700; and
  (C) stannous oxide, and heating the mixture to a temperature to evolve water and to form said polymeric polyester by direct esterification reaction, heating being continued until an acid value of less than about 3 is attained.
2. A method of preparing a polymeric polyester which comprises forming a mixture consisting essentially of:
  (A) a free alcohol containing at least two hydroxyl groups;
  (B) a free carbonyl compound selected from the class consisting of a dicarboxylic acid and the anhydride thereof, said alcohol and said carbonyl compound consisting of atoms of carbon, hydrogen and oxygen; and
  (C) about 0.001 to about 2 percent by weight based upon the mixture of stannous oxide and a liquid aromatic diluent which is adapted to form a constant boiling mixture with water evolved in the reaction, and heating the mixture to a temperature to evolve water and to effect removal of vapors of water and said diluent whereby to form polymeric polyester by direct esterification, heating being continued until an acid value below 3 is attained, the alcohol being present in the free state in the mixture along with the catalyst.
3. The method according to claim 2 wherein the car- bonyl compound comprises adipic acid and the polyol is selected from the class consisting of ethylene glycol, propylene glycol, diethylene glycol, dipropylene glycol, triethylene glycol, neopentyl glycol, 1,4-butanediol, 1,5-pentanediol, trimethylene glycol, polyethylene glycol and polypropylene glycol.

4. A process of preparing polyesters having acid numbers of less than about 5 from at least one polyhydric aliphatic alcohol with at least one member of the group consisting of dicarboxylic acids and anyhdrides thereof at a temperature to evolve water and to form polymeric polyester, which process comprises carrying out the polyesterification in the presence of a catalytic amount of stannous oxide.

References Cited in the file of this patent

UNITED STATES PATENTS

| | | |
|---|---|---|
| 2,257,384 | Johnston | Sept. 30, 1941 |
| 2,578,660 | Auspos et al. | Dec. 18, 1951 |
| 2,720,507 | Caldwell | Oct. 11, 1955 |

FOREIGN PATENTS

| | | |
|---|---|---|
| 1,005,947 | Germany | Apr. 11, 1957 |